Figure 1:
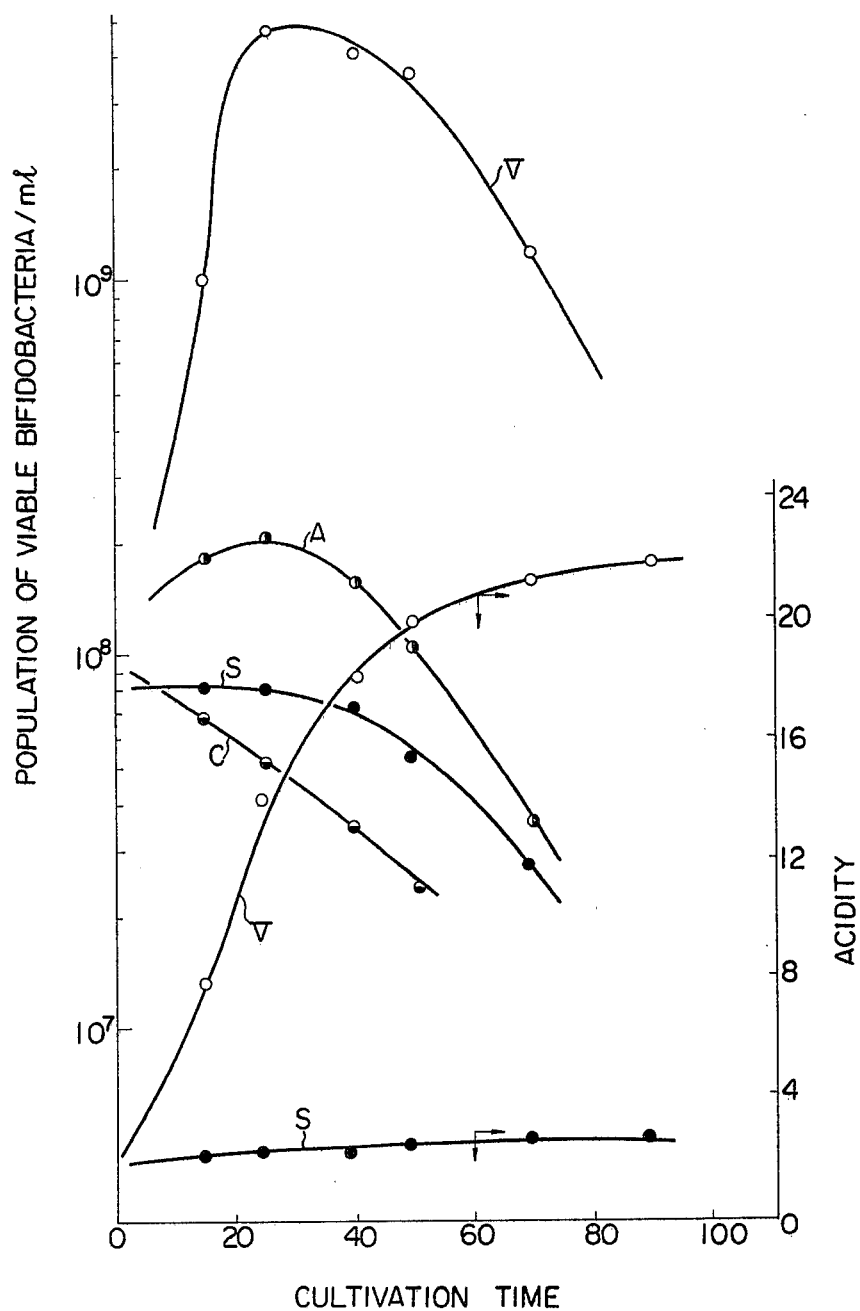

| United States Patent [19] | [11] | 4,091,117 |
|---|---|---|
| Mutai et al. | [45] | May 23, 1978 |

[54] FERMENTED MILK PRODUCT CONTAINING VIABLE BIFIDOBACTERIA

[75] Inventors: Masahiko Mutai, Higashi Yamato; Mitsuo Mada, Kodaira; Kei Nakajima, Fuchu; Shusei Takahashi, Higashi Murayama; Takashi Nakao, Hoya; Kiyohiro Shimada; Takashi Iijima, both of Kunitachi, all of Japan

[73] Assignee: Kabushiki Kaisha Yakult Honsha, Tokyo, Japan

[21] Appl. No.: 735,413

[22] Filed: Oct. 26, 1976

[30] Foreign Application Priority Data

Jan. 1, 1976    Japan ..................................... 51-296

[51] Int. Cl.$^2$ .............................................. A23C 9/12
[52] U.S. Cl. ......................................... 426/43; 426/61
[58] Field of Search ....................... 426/34, 42, 43, 61, 426/71

[56] References Cited

U.S. PATENT DOCUMENTS 3,480,443  11/1969  Schuler ............................. 426/61 X

FOREIGN PATENT DOCUMENTS 1,952,361  4/1971  Germany.
2,421,084  11/1975  Germany.
1,202,539  8/1970  United Kingdom.

*Primary Examiner*—David M. Naff
*Attorney, Agent, or Firm*—Wenderoth, Lind & Ponack

[57] ABSTRACT

This invention relates to a method for producing fermented milk containing viable bifidobacteria by cultivating a variant of bifidobacteria in a milk medium, characterized in that the variant of bifidobacteria is acid-resistant and can be propagated under an aerobic condition in a pure milk medium which does not contain any growth-promoting substance.

1 Claim, 1 Drawing Figure

FERMENTED MILK PRODUCT CONTAINING VIABLE BIFIDOBACTERIA

This invention relates to a fermented milk product containing viable bifidobacteria useful as food and drinks or an additive thereto, and a process for producing the same.

Bifidobacteria are well known as dominant bacteria found in the intestinal flora of a breast-fed infant. Bifidobacteria have been known to provide various physiological properties as follows:

(a) suppression of putrefactive bacteria;
(b) inhibition of production of toxic amines;
(c) promotion of digestion of human milk casein by the action of phosphoprotein phosphatase; and
(d) growth inhibition of pathogenic bacteria in conjunction with lowering the pH in the intestines by production of lactic acid, acetic acid, formic acid and the like.

However, an infant who is bottle-fed has very few intestinal bifidobacteria which, as mentioned above, have various effects in keeping the intestines healthy. This is considered to be the reason why a bottle-fed infant is more susceptible to intestinal diseases in comparison with a breast-fed infant. Therefore, for the purposes of converting the intestinal flora of a bottle-fed infant to those similar to that of a breast-fed infant, modified powdered milk for infants containing bifidobacteria has tentatively been prepared as a substitute for human milk.

However, according to the conventional process, cultivating bifidobacteria in a medium such as milk and the like has involved the following difficulties, and therefore has not been practically carried out on a commercial scale. The difficulties are (in comparison with the process for lactic acid bacteria which are widely used in processing milk):

(a) The conditions for cultivation must be strictly anaerobic;
(b) The nutritional requirement for the cultivation is complicated and strict, and therefore the bacteria do not propagate in a pure milk medium which does not contain any growth-promoting substance such as yeast extract and the like; and
(c) It is difficult to maintain the bacteria in a viable state for a long time at low pH like in a conventional fermented milk since the acid-resistance of the bifidobacteria is low.

If growth-promoting substance for bifidobacteria is added to the milk medium, the bifidobacteria can be cultivated even in an aerobic condition. However, the product from this culture often impairs the taste and flavor of the milk product. In addition to this disadvantage, growth-promoting substances are generally expensive, and therefore not practically used.

As a study of culture using bifidobacteria, we have discovered a new strain of bifidobacteria having unique properties, which can be actively propagated under aerobic conditions in a pure milk medium which does not contain any growth-promoting substances or reducing agents.

The present invention is based on this discovery of bifidobacterium variant, and relates to a fermented milk preparation containing the viable bifidobacteria obtained by using a new method for producing the same. The present invention is explained in the following.

First, various properties of a typical strain of bifidobacteria (Bifidobacterium bifidum YIT-4005) used in accordance with the present invention are described below. This new strain was isolated from the feces of a healthy breast-fed infant by treatment in a low pH buffer solution several times.

(1) TAXONOMICAL PROPERTIES

This strain is Gram-positive non-spore forming bacillus, and has intracellular granules having an affinity with methylene glue. According to microscopic observation, the bacteria are polymorphous with bifid edges showing Y-shape or bend. A colony formed by double-layer plate method is cylindric, convex or lens-shaped and a colony formed at the bottom of the plate is variable in shape. When cultivated in a non-fat milk medium (solid milk content = 12%) for 72 hours, the mole ratio of acetic acid and lactic acid formed becomes $1.7 \pm 0.5$ (acetic acid/lactic acid).

The results of the following tests were as follows: Catalase activity (−), Carbon dioxide gas production (−), Milk coagulating activity (+), Gelatine hydrolysis (−), Nitrate reducing activity (−), Indole production (−) and Hydrogen sulfide generation (−).

The bacteria of this invention have positive fermentation reaction with regard to the following sugars: glucose, fructose, lactose and galactose.

The bacteria have negative fermentation reaction with regard to the following sugars: arabinose, xylose, salicin, mannose, mannitol, melezitose, cellobiose, sorbitol, inulin, trehalose, rhamnose, maltose, ribose and sorbose.

In view of the above properties, the bacterial strain of this invention corresponds to *Bifidobacterium bifidum*, according to Bergey's Manual of 1974 but was classified as a variant of *Bifidobacterium bifidum* since it has novel properties which are not possessed by known bifidobacteria and this variant was named as "*Bifidobacterium, bifidum* YIT-4005".

(2) GROWTH CONDITIONS

Temperature: 25° − 45° C (Optimum: 36° − 38° C)
pH: 5 − 7 (Optimum pH: 6 − 7)

(3) ACID RESISTANCE

The strain of this invention and a standard strain (*Bifidobacterium bifidum* E 319 which is hereinafter referred as "standard strain") were respectively cultivated in an anaerobic VL-G liquid medium for 48 hours and the cultivated bacteria were collected aseptically by centrifugation. Washed cell suspensions (OD 660 mμ = 1.5) were added to buffer solutions (pH 6.0: 1/100 M phosphoric acid, pH 5.0 − 4.0: 1/100 M acetic acid) having various pH values as shown in Table 1. The resultant solutions were kept at 5° C to determine viability of bifidobacteria with the lapse of time.

As shown in Table 1, in the case of the standard strain, the number of viable bifidobacteria rapidly decreased with a decrease of pH (particularly below 4.6). On the other hand, in the case of the strain of this invention, the number of viable bifidobacteria was very stable even at low pH near 4.0 and thus the bacteria of this invention was proved to have high acid-resistance (the numbers in Table 1 indicate the number of viable bacteria per milliliter).

Table 1

| pH | Strain* | Number of Days Preserved | | | | |
|---|---|---|---|---|---|---|
| | | 0 | 3 | 5 | 7 | 10 |
| 6.0 | V | $4.7 \times 10^8$ | $3.8 \times 10^8$ | $3.7 \times 10^8$ | $4.0 \times 10^8$ | $3.0 \times 10^8$ |
| | S | $4.5 \times 10^8$ | $3.1 \times 10^8$ | $6.8 \times 10^7$ | $4.2 \times 10^7$ | $2.1 \times 10^7$ |
| 5.0 | V | $5.0 \times 10^8$ | $3.8 \times 10^8$ | $2.4 \times 10^8$ | $3.0 \times 10^8$ | $3.3 \times 10^8$ |
| | S | $4.9 \times 10^8$ | $3.1 \times 10^8$ | $5.5 \times 10^7$ | $1.9 \times 10^7$ | $2.1 \times 10^6$ |
| 4.6 | V | $4.2 \times 10^8$ | $5.1 \times 10^8$ | $4.2 \times 10^8$ | $2.0 \times 10^8$ | $9.3 \times 10^7$ |
| | S | $4.5 \times 10^8$ | $1.0 \times 10^7$ | $3.6 \times 10^5$ | $4.0 \times 10^3$ | $<10^2$ |
| 4.3 | V | $4.6 \times 10^8$ | $4.0 \times 10^8$ | $2.1 \times 10^8$ | $6.9 \times 10^7$ | $3.0 \times 10^7$ |
| | S | $4.2 \times 10^8$ | $3.9 \times 10^6$ | $2.1 \times 10^4$ | $<10^2$ | $<10^2$ |
| 4.1 | V | $4.7 \times 10^8$ | $9.5 \times 10^7$ | $3.4 \times 10^7$ | $5.6 \times 10^6$ | $4.3 \times 10^5$ |
| | S | $4.5 \times 10^8$ | $4.1 \times 10^4$ | $1.0 \times 10^3$ | $<10^2$ | $<10^2$ |
| 4.0 | V | $5.0 \times 10^8$ | $7.0 \times 10^6$ | $8.0 \times 10^5$ | $2.8 \times 10^5$ | $2.9 \times 10^4$ |
| | S | $4.9 \times 10^8$ | $1.2 \times 10^3$ | $<10^2$ | $<10^2$ | $<10^2$ |

*V: Bifidobacterium bifidum YIT-4005
S: Bifidobacterium bifidum E319

The same tendency was recognized in the milk culture. The various strains of bifidobacterium as shown in Table 2 were cultivated in a non-fat milk medium (solid milk content = 10%) containing 0.3% of yeast extract until the pH of the cultures reached the values in the Table. The cultures were then rapidly cooled and kept at 5° C to determine the viability of the bifidobacteria with the lapse of time.

Table 2

| pH | Strain* | Number of Days Preserved | | | | |
|---|---|---|---|---|---|---|
| | | 0 | 3 | 5 | 7 | 10 |
| 4.61 | V | $4.1 \times 10^9$ | $3.1 \times 10^9$ | $2.0 \times 10^9$ | $7.6 \times 10^8$ | $4.3 \times 10^8$ |
| | S | $6.8 \times 10^8$ | $2.0 \times 10^7$ | $4.3 \times 10^6$ | $5.3 \times 10^5$ | $1.6 \times 10^4$ |
| | A | $3.3 \times 10^9$ | $5.6 \times 10^8$ | $1.5 \times 10^7$ | $4.3 \times 10^6$ | $2.1 \times 10^5$ |
| | B | $1.5 \times 10^9$ | $2.7 \times 10^8$ | $5.3 \times 10^7$ | $9.6 \times 10^6$ | $7.7 \times 10^6$ |
| | C | $8.8 \times 10^8$ | $6.2 \times 10^7$ | $2.5 \times 10^6$ | $5.1 \times 10^5$ | $2.9 \times 10^4$ |
| | D | $4.3 \times 10^9$ | $7.1 \times 10^8$ | $7.9 \times 10^7$ | $6.3 \times 10^6$ | $4.4 \times 10^5$ |
| 4.21 | V | $1.8 \times 10^9$ | $7.6 \times 10^8$ | $9.8 \times 10^8$ | $7.0 \times 10^7$ | $2.4 \times 10^6$ |
| | S | $2.5 \times 10^8$ | $2.0 \times 10^6$ | $4.5 \times 10^4$ | $<10^2$ | $<10^2$ |
| | A | $9.9 \times 10^8$ | $7.5 \times 10^6$ | $8.2 \times 10^5$ | $2.3 \times 10^3$ | $<10^2$ |
| | B | $4.2 \times 10^9$ | $2.5 \times 10^7$ | $4.9 \times 10^5$ | $2.4 \times 10^3$ | $<10^2$ |
| | C | $2.1 \times 10^9$ | $1.5 \times 10^7$ | $8.7 \times 10^4$ | $<10^2$ | $<10^2$ |
| | D | $7.7 \times 10^8$ | $2.1 \times 10^7$ | $6.3 \times 10^5$ | $1.5 \times 10^4$ | $<10^2$ |

*V: Bifidobacterium bifidum YIT-4005
S: Bifidobacterium bifidum E319
A: Bifidobacterium bifidum
B: Bifidobacterium bifidum YIT-4002
C: Bifidobacterium longum standard strain
D: Bifidobacterium longum

(4) GROWTH UNDER AEROBIC CONDITIONS

A non-fat milk medium (solid milk content = 12%) was sterilized by heating and then cooled to 37° C while introducing air through the medium. The strain of this invention and some of the comparative strains as shown in Table 2 were respectively cultivated in the above prepared medium at 37° C. The change in the number of viable bacteria and the acidity of the culture (milliliters of 0.1 N sodium hydroxide required to neutralize 10 ml of the culture) during cultivation are shown in FIG. 1. The marks in FIG. 1 represent the same as those of Table 2.

As clearly seen from this Figure, the bacteria of this invention propagated and reached $10^9$ viable cells/ml or more from the initial population of $10^7 - 10^8$/ml in 24 hours, while the standard strain did not propagate under this condition.

This propagation tendency of the bacteria of this invention was substantially the same as that under an anaerobic condition.

This new strain of the present invention, "*Bifidobacterium bifidum* YIT-4005" was deposited at FERMENTATION RESEARCH INSTITUTE, Agency of Industrial Science & Technology of No. 8-1, Inage Higashi-5-chrome, Chiba-shi, Chiba-ken, Japan. The deposit number is FERM-P No. 3372.

*Bifidobacterium bifidum* YIT-4002 disclosed in Table 2 as a comparative strain has almost the same properties as *Bifidobacterium bifidum* YIT-4005 of the present invention, except for acid-resistance, and its deposit number is FERM-P No. 3371.

Generally speaking, the strains which propagate under aerobic condition to the same extent as *Bifidobacterium bifidum* YIT-4005 of this invention are preferred for the manufacture of fermented milk. Although acid-resistance is not always required, depending on the use of products, the resistance to the same extent as the bacteria of this invention is desirable. The population of viable bifidobacteria should be at least $10^4$/ml after 7 days of preservation at pH 4.0 under the conditions used in preparing the data in the above Table 1.

As mentioned above, advantages of the use of the new strain of bifidobacteria of this invention are as follows:

(a) It is easily cultivated without using any special cultivation conditions. That is, it is easily propagated under an aerobic condition without adding any growth-promoting substance.

(b) The problem of impairing the flavor of the cultivated product, due to growth-promoting additives, is solved and the seasoning of the cultivated product is easy.

(c) Since the cultivated product of this invention does not contain any additives such as growth-promoting substances, it is desirable for the production of infant food or as an additive to infant food.

(d) The new strain is essentially oxygen-resistant and the nutrition conditions required for the cultivation are simple. Consequently, the cultivated product (or processed cultivated product) maintains high viability of the bacteria during preservation, and is relatively easily processed into food and drink without substantial loss in viability of the bacteria. High acid-resistance of the bacteria of this invention is important particularly in this respect.

Thus, by using the new strain of bifidobacteria of this invention, it has become possible to conduct the efficient cultivation which could not be carried out by using the conventional known bifidobacteria, and to produce food and drink containing the viable bifidobacteria.

In the cultivation of the bifidobacteria of this invention, it is possible to employ an aerobic condition used for the cultivation of ordinary lactic acid bacteria, and accordingly it is possible to carry out a mixed cultivation of the bifidobacteria with lactic acid bacteria. Reducing agents and growth-promoting substances absolutely required for the cultivation of conventional bifidobacteria are not necessary for the cultivation of the new bifidobacterial strain. However, a growth-promoting agent may be used in the process of this invention for the growth stimulation to an extent which does not hinder the use of the cultured product.

Milk culture media used in this invention are a lactose-containing component such as reconstituted milk, milk whey, whole milk, skim milk and the like prepared from these ingredients.

Under ordinary cultivation conditions, the population of viable bifidobacteria reaches a maximum in 18 –

24 hours and the pH of the culture decreases due to the acid production during the cultivation. Acetic acid production begins at the initial stage of the cultivation. The mole ratio of acetic acid and lactic acid remains substantially constant during the cultivation, and is 1.7 ± 0.5 (acetic acid/lactic acid).

If the cultivation proceeds further, the population of viable bifidobacteria begins to decrease but the production of the acid still continues for a while and the acid becomes saturated. Consequently, the cultivation is stopped at a suitable stage depending on the use of the cultured product. As long as viable bifidobacteria are utilized, the population of viable bifidobacteria should preferably be at least $10^7$/ml. By the use of the cultivation method of this invention, the population of viable bifidobacteria of at least $10^9$/ml is easily obtained.

The cultured product of this invention containing a large number of viable bifidobacteria having excellent survivability and their milk metabolites, particularly an organic acid mixture predominantly comprising acetic acid and lactic acid, can be utilized as a food as it is or as an additive to food and drinks. Alternatively, the cultured product of this invention can be mixed with seasonings such as sweetenings, fruit juice, flavorings, water and the like to produce a novel fermented milk beverage. Carefully freeze-dried or spray-dried material of the cultured product of this invention contains $10^9$ or more viable bifidobacteria per g dry weight. The powdered material thus dried is easy to handle and therefore can be more widely utilized, in addition to the above mentioned uses. For example, the cultured product and its dried material can be used in combination with food and drinks having a pH of 4 – 7, which are not heated to the lethal temperature of the bifidobacteria, such as milk, condensed milk, powdered milk, raw cream, milk fermented by lactic acid bacteria, ice cream, butter, cheese, vegetable juice, fruit juice, soybean milk, fermented soybean milk, mayonnaise, dressing, ketchup, paste, jam, fish flour, and other specialities such as baby food and diet food. The viable bifidobacteria-containing product is mixed with these food and drinks 12 hours before being served or it may be mixed in the process of the preparation of these food and drinks, thus providing food and drinks containing viable bifidobacteria and having pleasant flavour. The dried product may be mixed with yeast powder, Chlorella powder, sugar and the like as desired, or the mixture made into a tablet. It may also be mixed with drugs such as digestives.

The present invention is further illustrated by the following Examples. "Variant" in the Examples refers to the new strain of this invention, i.e. "*Bifidobacterium bifidum* YIT-4005 (FERM-P No. 3372)".

EXAMPLE 1

Ten % of the starter culture of the Variant was inoculated in 10 liters of heat-sterilized skim milk and was cultivated at 37° C for 3 hours. To the cultivated product was added 0.05% of rennet powder (30,000 units) to form curd. The curd was then sliced, and was washed with water, while removing whey. By adding 12% of cream, the fat content of the curd was adjusted to 30%, and table salt, flavoring and stabilizer were then mixed with the curd, thus preparing cheese containing bifibobacteria. The cheese thus prepared contained 7.6 × $10^7$ viable bifidobacteria/g at the stage immediately after the preparation. The number of viable bifidobacteria became 2.6 × $10^7$/g on the tenth day of preservation.

EXAMPLE 2

Heat-sterilized reconstituted skim milk (solid milk content = 16%) was cooled with stirring by introducing sterile air thereinto and was inoculated with 2% of the starter culture of the Variant.

After incubation at 37° C for 48 hours, 525 ml of the culture was mixed with 475 ml of syrup containing 80 g of sugar, and flavours were added to the mixture. The resultant mixture was homogenized to prepare fermented milk containing viable bifidobacteria. The fermented milk thus prepared had a pH value of 4.30 and the number of the viable bifidobacteria was 3.6 × $10^9$/ml, which decreased to 4.9 × $10^7$/ml on the seventh day of preservation.

EXAMPLE 3

The solid milk content of a milk medium was adjusted to 16% by adding skimed dry milk. After sterilization, the medium was inoculated with 5% of the starter culture of *Lactobacillus acidophillus* and 1% of the starter culture of the Variant to carry out a mixed cultivation at 37° C for 20 hours. To 525 ml of the culture solution was added 200 ml of fruit juice (banana juice/tangerine juice = 3/1), and 475 ml of syrup containing 60 g of sugar and flavourings. The mixture was then homogenized. The fermented milk thus prepared containing viable bifidobacteria and fruit juice had a pH value of 4.40 and contained 2.6 × $10^9$ viable bifidobacteria/ml and 4.8 × $10^8$ *L. acidophillus/ml*. The number of viable bifidobacteria and viable *L. acidophillus* decreased to 6.8 × $10^7$/ml and 2.0 × $10^6$/ml on the seventh day of preservation, respectively.

EXAMPLE 4

To prepare 1 liter of a medium, 70 g of defatted soybean powder, 30 g of milk whey powder and 10 g of lactose were added to water. After sterilization the medium was inoculated with 5% of the starter culture of the Variant and was incubated at 37° C for 72 hours. To 500 ml of the culture was added 500 ml of syrup containing 60 g of sugar and 50 g of sorbitol and flavourings. The resultant mixture was homogenized. Fermented soybean milk thus prepared had a pH value of 4.3 and contained 1.6 × $10^9$ viable bifidobacteria/ml. The number of the viable bifidobacteria decreased to 3.8 × $10^7$/ml on the sixth day of preservation.

EXAMPLE 5

In 900 ml of water, 100 g of skim milk powder was dissolved to prepare a medium. After sterilization, the medium was inoculated with 2% of the starter culture of the Variant, and was incubated at 37° C for 24 hours. The medium thus cultivated had 2.8 × $10^9$ viable bifidobacteria/ml, acidity of 10.5 and mole ratio of acetic acid/lactic acid of 1.7.

The culture was frozen as it was and was dried for about 7 hours under reduced pressure of 2mm Hg or less. Thus, 105 g of the dried material containing 5.5 × $10^9$ viable bifidobacteria/g was obtained.

EXAMPLE 6

Two % of starter of the Variant was inoculated in reconstituted milk media (sold milk content = 16%) containing the following growth-promoting agents respectively: (a) peptone; (b) CSL (corn steep liquor); and (c) yeast extract. The cultivation was carried out at 37° C for 15 hours. Using the above cultivated product, fermented milk was prepared in the same manner as in Example 2. Properties of the fermented milk thus prepared are shown in Table 3, and the results of taste evaluation carried out with respect to the fermented milk are shown in Table 4.

Table 3

| Growth-promoting substance | | Acidity | pH | Number of Viable Bifidobacterial/ml |
|---|---|---|---|---|
| None | | 7.0 | 4.75 | $1.5 \times 10^9$ |
| Peptone | 0.5% | 8.0 | 4.55 | $2.0 \times 10^9$ |
| CSL | 1.0% | 7.2 | 4.60 | $1.6 \times 10^9$ |
| Yeast extract | 0.3% | 7.0 | 4.75 | $2.5 \times 10^9$ |

Table 4

| Growth-promoting Subtance | Taste Evaluation* |
|---|---|
| None | $+0.3 \int 1.3$ |
| Peptone | $-1 \int 0$ |
| CSL | $-0.5 \int +0.4$ |
| Yeast extract | $-1 \int +0.1$ |

| | Significance of Difference | | | | |
|---|---|---|---|---|---|
| Factorial effect | Sum of squares | Degree of freedom | Unbiased variance | $F_o$ | Level of significance |
| Main effect | 46.042 | 3 | 15.347 | 24.444 | up to 1% |
| Combination effect | 0.291 | 3 | 0.097 | 0.155 | — |
| Ordinal effect | 32.000 | 6 | 5.333 | 8.494 | up to 1% |
| Error | 37.667 | 60 | 0.628 | — | — |

*−1: poor
0: average
+1: good
+2: better

EXPERIMENTAL METHOD

The significance of other intergroups differences was assessed by Scheffe's paired comparative method for 12 combinations made from 4 kinds of paired samples. There were 36 people in the test panel.

EXAMPLE 7

Three % of the starter culture of the Variant was inoculated in a medium having a pH value of 6.8 and containing 3% of yeast extract powder, 5% of corn steep liquor, 0.5% of citric acid, 0.5% of ammonium sulfate, 1% of lactose and 0.03% of cysteine hydrochloride. The cultivation was conducted at 37° C for 72 hours. The culture was subjected to a centrifuge, and the collected bacteria were suspended in water containing 5% of skim milk hydrolysates by protease, 5% of sugar and 1% of vitamin C. The suspension was then freeze-dried.

The dried bacterial powder thus obtained was added to sterilized milk in an amount of 2%. The mixture was then homogenized and was charged in a container, thus preparing milk containing $4.6 \times 10^8$ viable bifidobacteria/ml, which decreased to $2.2 \times 10^6$/ml on the sixth day of preservation.

EXAMPLE 8

To prepare 150 liters of starting material for ice cream, 7 kg of raw cream (fat content = 40%), 20 kg of sweetened condensed whole milk, 64 liters of milk, 2 kg of skim milk powder, 6 kg of sugar and 0.3 kg of stabilizer were dissolved in water. The mixture was then heat-sterilized, homogenized and cooled to a temperature of 40° C or lower. The dry bacterial powder prepared in the above Example 7 was added to the mixture in an amount of 1%. The mixture was dispensed into cups, and then solidified at −20° C, thereby preparing ice cream containing $3.0 \times 10^8$ viable bifidobacteria/ml, which decreased to $2.2 \times 10^6$/ml in the third month of preservation.

EXAMPLE 9

Sliced vegetables comprising 130 g of carrot, 100 g of tomato, 3 g of celery and 100 g of cabbage were boiled in 500 ml of water. The boiled vegetables were then mashed in a mixer and filtered through a cloth to prepare vegetable juice. To 100 ml of the vegetable juice, were added 10 g of Chlorella powder, 0.5 g of table salt, 0.1 g of spices and 1 g of the dry bacterial powder prepared in the above Example 7 to prepare vegetable juice containing $2.8 \times 10^8$ viable bifidobacteria/ml. This number decreased to $6.5 \times 10^7$/ml on the tenth day of preservation.

EXAMPLE 10

The dry bacterial powder prepared in the above Example 7 was mixed with whole milk powder in an amount of 5 g per 100 g of the whole milk powder. Nitrogen-gas was the changed into the mixture to prepare infant milk powder containing $1.0 \times 10^9$ viable bifidobacteria/g, which decreased to $5.1 \times 10^7$/g after 3 months of preservation.

What is claimed is:

1. A method for producing fermented milk containing viable bifidobacteria, which comprises cultivating Bifidobacterium bifidum YIT-4005 in a medium consisting of reconstituted milk, milk whey, whole milk or skim milk.

* * * * *